UNITED STATES PATENT OFFICE.

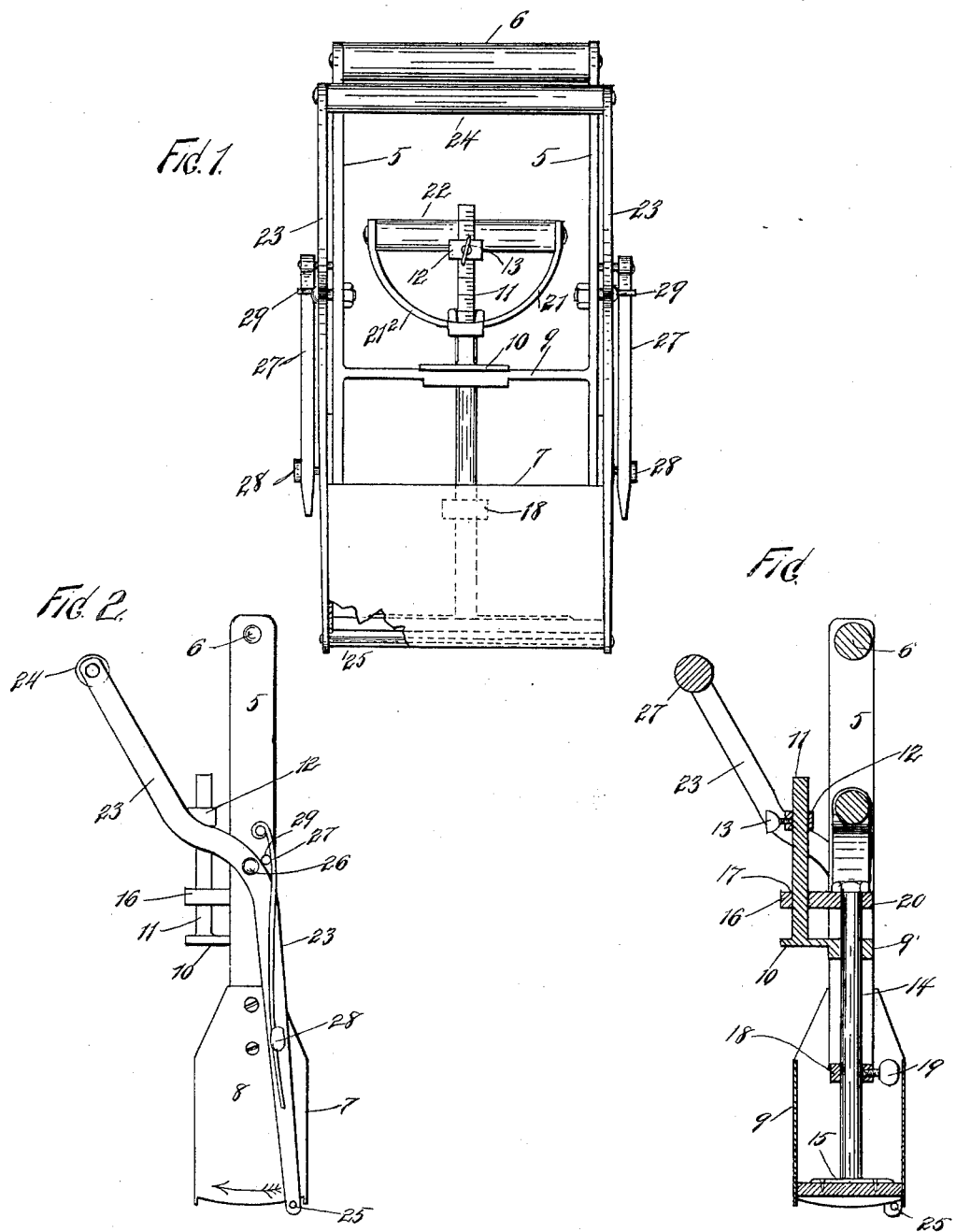

LUMAN H. DAVIS, OF RIDGEFIELD, CONNECTICUT.

DEVICE FOR CUTTING, WEIGHING, AND MEASURING BUTTER, &c.

SPECIFICATION forming part of Letters Patent No. 595,049, dated December 7, 1897.

Application filed December 30, 1896. Serial No. 617,449. (No model.)

*To all whom it may concern:*

Be it known that I, LUMAN H. DAVIS, a citizen of the United States, residing at Ridgefield, in the county of Fairfield and State of Connecticut, have invented certain new and useful Improvements in Devices for Cutting and Weighing or Measuring Butter and Similar Substances, of which the following is a full and complete specification, such as will enable those skilled in the art to which it appertains to make and use the same.

This invention relates to devices for cutting and weighing or measuring butter, lard, and similar substances; and the object thereof is to provide an improved device of this class which is simple in construction and operation and which is well adapted to produce the result for which it is intended, while being also comparatively inexpensive.

The invention is fully disclosed in the following specification, of which the accompanying drawings form a part, in which—

Figure 1 is a side view of my improved device, part thereof being broken away to better show the construction; Fig. 2, a side view thereof, and Fig. 3 a central vertical section.

In the drawings forming part of this specification the separate parts of my improvement are designated by the same numerals of reference throughout the several views; and in the practice of my invention I provide a device of the class herein specified which consists of a frame composed of two similar side plates or bars 5, the upper ends of which are connected by a cross-rod or handle 6, and to the lower ends of which is secured a casing 7, which consists of two similar side plates 8 and front and back plates 9.

The casing 7 is rectangular in cross-section, and mounted centrally between the side plates or bars 5 of the frame is a cross-bar 9', which is provided with a forwardly-directed arm 10, which is provided with an upwardly-directed scale-rod 11, on which is mounted a slide 12, which is adapted to be held in place on said scale-rod by a set-screw 13. Passing vertically through the cross plate or bar 9 is a shaft 14, the lower end of which is provided with a plunger 15, which is rectangular in form and adapted to fit the interior of the casing 7, while being free to slide therein, and the upper end of the shaft 14 is provided with an arm 16, which is secured therein in any desired manner and which projects outwardly and is provided with a vertical opening 17, through which the scale-rod 11 passes. I also prefer to mount on the shaft 14, below the transverse plate or bar 9, a vertically-adjustable sleeve or collar 18, which is provided with a set-screw 19, and the arm 16, which is secured to the upper end of the shaft 14, is connected therewith by a collar 20, which is provided with upwardly-curved arms 21, the upper ends of which are connected by a cross-rod or handle 22.

Pivotally connected with the outer end of each of the plates or bars 5 of the main frame is a lever 23, the upper ends of which are directed forwardly and upwardly, as shown in Fig. 2, and connected by a cross-rod or handle 24, and the lower ends of said levers project downwardly adjacent to the sides 8 of the casing 7, and the lower ends thereof are connected by a small wire 25, composed of steel or other preferred metal, and secured to the outer side of each of said plates or bars 5, above the pivotal connection at 26 of the levers 23, is a spring 27, which extends downwardly adjacent to said levers, and the lower end of each of these springs operates in connection with a lug or projection 28, one of which is secured to or formed on each of said levers, and the object of the springs 27 is to throw the lower ends of said levers outwardly in a direction opposite to that of the rod shown in Fig. 2.

The lower ends of the sides 8 of the casing 7 are slightly curved or segmental in form, and the operation will be readily understood from the foregoing description when taken in connection with the accompanying drawings and the following statement thereof.

Secured to the outer sides of the plates or bars 5 of the main frame, between the pivotal connection of the levers 23 and the springs 27, is a pin or projection 29, in connection with which said springs operate, and whenever it is desired to weigh a portion of the butter, lard, or other substance the slide 12 is adjusted on the scale-rod 11 to the proper height, and the shaft 14, together with the plunger 15, is raised until the arm 16 strikes said slide. The lower end of the casing 7 is then forced into the butter or other substance until said substance reaches the plunger, this operation being performed by the cross-bar or handle 6. The upper ends of the levers 23 are then forced in the direction of the cross-bar or handle 6, and in this operation the wire 25, which operates as a cutter, passes across the lower end of the casing 7 in the direction of the arrow shown in Fig. 2 and severs the butter or other substance in the casing from the bulk of the material into which the casing is inserted, after which the casing is removed, and, the levers 23 being released, the springs 27 force the lower ends thereof backwardly into the position shown in Fig. 2, or beyond the back 9 of the casing 7, and then by depressing the shaft 14 and the plunger 15 by means of the cross-rod or handle 22 the butter or other substance within the casing 7 will be discharged therefrom.

The object of the collar or sleeve 18 is to provide further means for adjusting the movement of the shaft 14, it being understood that when said collar or sleeve is properly adjusted it will strike the cross-bar 9' of the main frame when said shaft is raised, and the scale may be placed on the shaft 14, if desired, and other changes in and modifications of the construction herein described may be made without departing from the spirit of my invention or sacrificing its advantages.

Having fully described my invention, I claim as new and desire to secure by Letters Patent—

1. The herein-described device for weighing, cutting or measuring butter, comprising a frame composed of two similar side plates or bars connected at the upper end by a cross-rod or handle and a casing secured to the lower end thereof, said casing consisting of two similar side plates and front and back plates, a cross-bar mounted centrally between the side plates of the said frame, provided with a forwardly-directed arm to which is secured an upwardly-directed scale-rod on which is mounted a slide adapted to be held in place by a set-screw, said cross-bars being provided with a bore through which passes a shaft the lower end of which is provided with a plunger adapted to fit the interior of said casing and being free to slide therein, the upper end of said shaft being provided with an outwardly-projecting arm having a vertical opening therein, through which the said scale-rod passes, a vertically-adjustable collar or sleeve mounted on the shaft 14 below the plate 9, said collar being provided with a set-screw, and the arm 16 is connected with the said shaft by means of a collar provided with upwardly-curved arms the upper ends thereof being provided with a cross-rod or handle, and levers which are pivotally connected with the outer end of each of the bars of the frame, and a cross-rod or handle connecting the said levers at the outer end thereof, the lower ends being connected by a small wire and adapted to be drawn across the bottom of said casing, and a spring to engage the said levers and return them to their normal position, as set forth.

2. The herein-described device for weighing or measuring butter, the same comprising a frame which consists of side plates 5, and cross-rod 6, the lower ends of said side plates being connected with a rectangular casing 7 which consists of side plates 8 and front and back plates 9, a cross-bar 9 having an arm 10 which is provided with a scale-rod 11 having a slide 12 and a set-screw 13, a shaft 14 vertically mounted in the cross-plate 9', and provided with a plunger 15, and an arm 16 having an opening 17, said shaft being also provided with a sleeve 18, having a set-screw 19, and a collar 20, and also having arms 21 which are connected by a cross-rod 24, and a wire 25; said bars 5 being each provided with a spring 27 adapted to engage a lug 28, all substantially as shown and described and for the purpose set forth.

In testimony that I claim the foregoing as my invention I have signed my name, in presence of the subscribing witnesses, this 26th day of December, 1896.

LUMAN H. DAVIS.

Witnesses:
 GEO. H. BECKER,
 GEO. I. JOHNSON.